Patented June 1, 1943

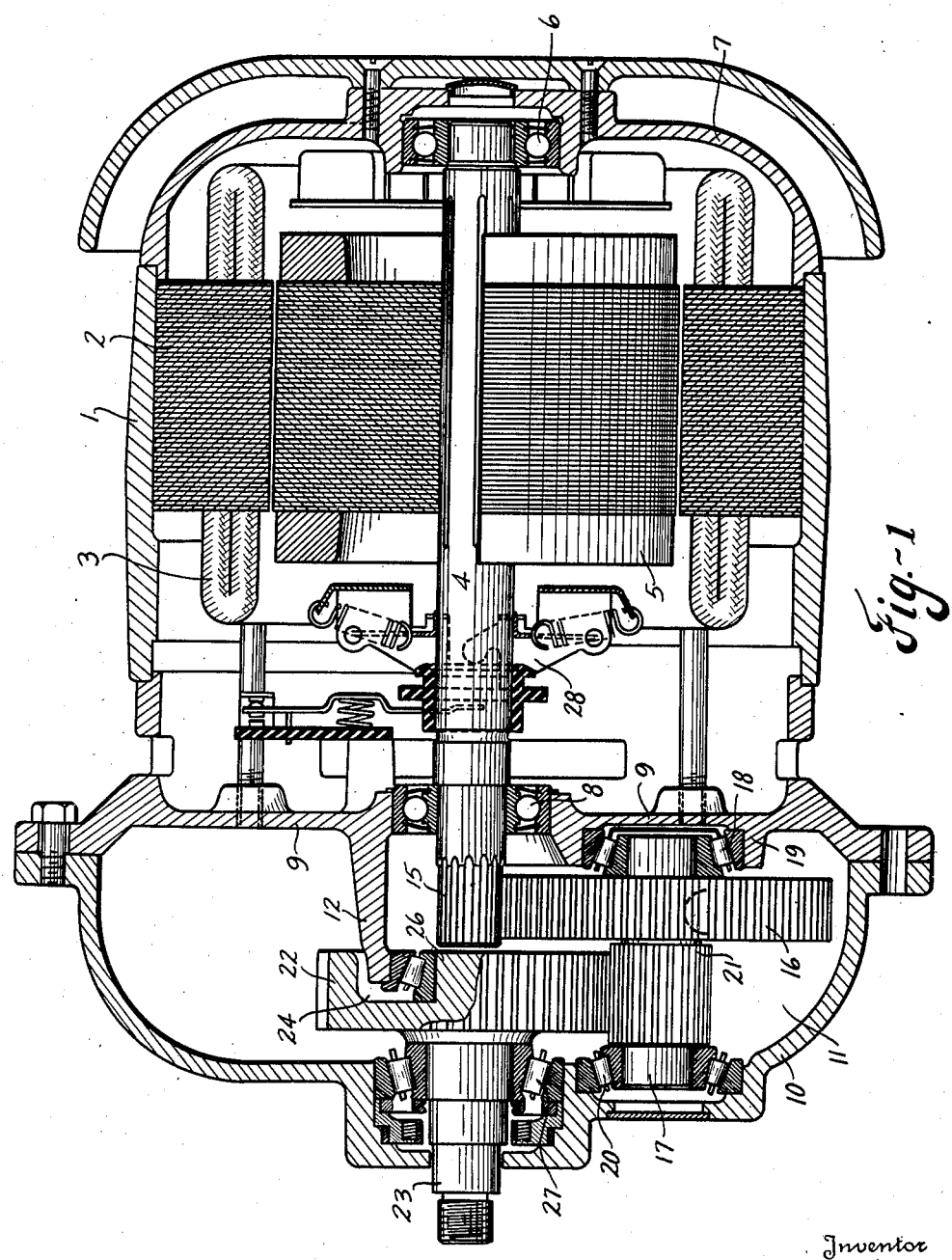

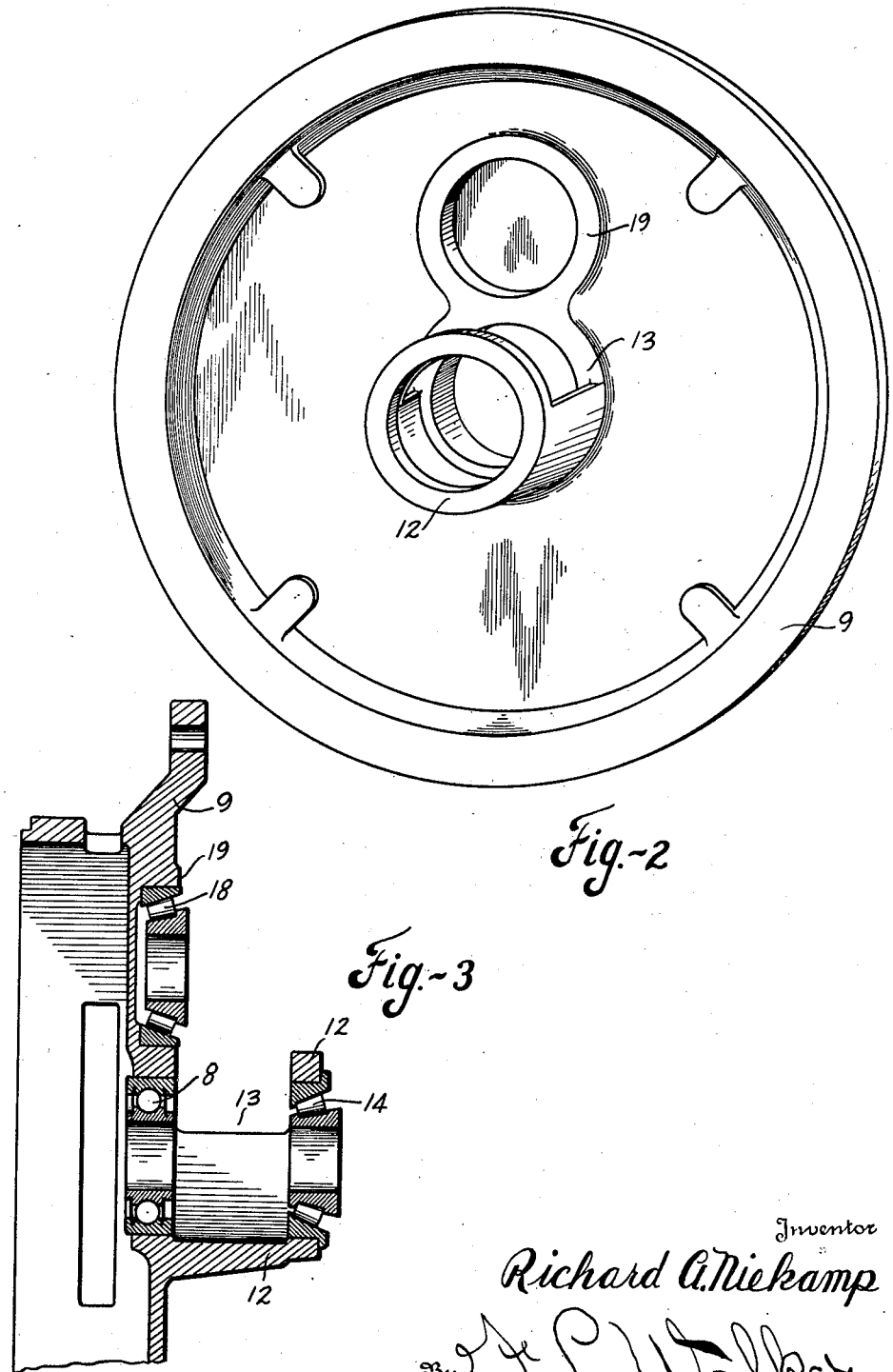

2,320,379

UNITED STATES PATENT OFFICE 2,320,379

ELECTRIC MOTOR GEARING

Richard A. Niekamp, Dayton, Ohio, assignor to The Master Electric Company, Dayton, Ohio, a corporation of Ohio Application June 1, 1940, Serial No. 338,338

6 Claims. (Cl. 74—421)

This invention pertains to electric motors, and more particularly to a gear head type motor having a self-contained reduction gear train, and the method of mounting the power transmission parts to conserve space.

For certain applications, such as floor treating machines, mixing machines, and other domestic or nonindustrial uses, in homes, offices, hospitals and the like, it is quite desirable that the assembly of a driving motor and a reduction gear train be short coupled and compact, and that the housing be symmetrical and its center of gravity low, and that the noise of operation be minimized. It is desirable that the power output shaft of such installations be in axial alignment with the driving shaft of the power unit to facilitate such compact symmetrical design. The close coupled compact arrangement presents some problems of design and manufacture to enable ample spacing of bearings to afford quiet operation and maximum life.

A primary object of the present invention is to improve the construction and assembly of gear head type motors, whereby they may not only be economically manufactured, but will be more efficient in use, of compact construction and relatively small size, symmetrical form, and unlikely to get out of repair.

A further object of the invention is to provide a compact back gear assembly by which a power take-off shaft may be axially aligned with a drive shaft for differential rotation thereby, all within a minimum axial extent.

A further and important object of the invention is to provide an improved support for the respective shaft bearings.

A further object of the invention is to provide a motor housing head having provision therein for multiple shaft bearings relatively located to accommodate a drive shaft, a counter shaft and a power shaft, respectively.

A further object of the invention is to provide a single integral motor housing head having therein aligned bearing mounts for different shafts.

A further object of the invention is to incorporate in an electric motor a speed reduction gear train and provide mounting for the operating parts thereof having the advantageous structural features and inherent meritorious characteristics herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the drawings, wherein is shown the preferred but obviously not necessarily the only embodiment of the invention, Fig. 1 is a longitudinal sectional view of a gear head motor embodying the present invention.

Fig. 2 is a perspective view of the motor housing head adapted to support multiple shaft bearings, shown in reverse position from that of Fig. 1.

Fig. 3 is a sectional view of the head with spaced shaft bearings located therein.

Like parts are indicated by similar characters of reference throughout the several views.

Referring to Fig. 1 of the drawings, 1 is the motor housing, within which is the stator 2 having windings 3. Mounted on a rotary shaft 4 is the rotor 5. The shaft 4 is mounted at one end in a bearing 6 in an end bell or head 7 of the motor housing. At its opposite end it is mounted in a bearing 8 in a head 9. Beyond the head 9 is an end bell 10, which forms with the head 9 a gear chamber 11. The motor housing head 9 is of peculiar construction comprising a disc having projecting concentrically therefrom an extended hollow hub 12. The hub is recessed in one side at 13, leaving at its end an annular portion of sufficient size to receive a bearing unit 14. The bearing 8 for one end of the shaft 4 is mounted in the inner end of the hub 12, in axial spaced alignment with the bearing 14.

The portion of the shaft 4 which projects beyond the bearing 8 into the hollow hub 12 carries a small gear pinion 15. This gear pinion may be cut directly on the end of the shaft 4 or may be a separate element secured thereon.

Projecting through the open side 13 of the hub 12 into intermeshing relation with the gear pinion 15 on the shaft 4 is a gear wheel 16 mounted on a countershaft 17. The shaft 17 has a bearing 18 seated in a cup-shaped boss 19 projecting from the face of the housing head 9. Its opposite end is journaled in a corresponding bearing 20 mounted in the gear housing or end bell 10. In addition to the gear wheel 16, the shaft 17 carries a gear pinion 21, which may be cut directly in said shaft, or may be a separate element mounted thereon. The gear pinion 21 on the countershaft 17 intermeshes with a driven gear 22 on a power shaft 23. For simplicity of construction and to conserve space, the gear 22 is shown formed integral with the power shaft 23, and recesses at one side as at 24, whereby the gear overhangs the extremity of the hollow hub 12. In the extremity of the hollow hub 12 is a bearing unit 14, in which is journaled one end of the power shaft 23, which in the particular embodiment comprises a hub 26 formed interiorly of the gear 22. The opposite end of the power shaft is mounted in a bearing 27 in the end bell 10. The power output shaft is thus supported in relatively spaced bearings 14 and 21. The shaft is axially aligned with the rotor shaft 4, and is symmetrical with the frame or housing 1.

The provision of the head unit 9 with the projecting hollow hub 12 having in one end the bearing 18 for the motor shaft and at its opposite end the bearing 14 for the power shaft, and having the lateral opening 13 through which the gear 16 engages with the pinion 15 intermediate the bearings, enables a compact close coupled construction which materially reduces the overall length of the assembly.

Mounted on the shaft 4 is a centrifugally operated switch mechanism 28, which, however, forms no part of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. The combination with an electric motor including a housing, a stator element, a rotor in cooperative relation with the stator, and a rotor shaft journaled in the housing, of a motor housing head, relatively spaced aligned shaft bearings supported by said head, in one of which the rotor shaft is journaled, a power output shaft journaled in the other of said bearings in axial alignment with the rotor shaft, a gear pinion carried by the rotor shaft intermediate the bearings, a gear carried by the power output shaft beyond the bearing engaged thereby, said power shaft gear being recessed and the aforementioned power shaft bearing being located within the recess of said gear, and a gear train interconnecting the gears upon the respective shafts.

2. In an electric motor, a motor housing, a stator element, a rotor element in cooperative relation with the stator, a rotor shaft and a power output shaft journaled in the housing in axial alignment with each other, spaced axially aligned bearings for the respective shafts, a common support for the spaced bearings, and a gear train operatively connecting the shafts one with the other for differential rotation, including a gear on one of the shafts having a lateral recess therein into which the common bearing support projects, whereby said gear surrounds its shaft bearing substantially in the plane thereof.

3. An electric motor including a housing, a wall dividing the housing into a motor compartment and a gear compartment, a stator, a rotor and a rotor shaft in the motor compartment, bearings for the rotor shaft in the terminal head of the housing and in the dividing wall, beyond which the shaft projects into the gear compartment, a lateral extension of the dividing wall, a bearing carried thereby and an axially aligned bearing in the terminal wall of the housing coincident with the gear chamber, a power output shaft axially aligned with the rotor shaft and journaled in the bearing of the lateral extension of the division wall and the bearing in the contiguous housing head, and a gear train connecting the rotor shaft and power output shaft for unison rotation, including a laterally recessed gear into the recess of which the lateral bearing extension of the division wall projects.

4. The combination with an electric motor including a housing, a stator element therein, a rotor in cooperative relation with the stator and a rotor shaft journaled in the housing, of a wall dividing the housing into a motor compartment and a gear compartment, a hub-like extension on the division wall, a pair of relatively spaced bearings in the hub-like extension, in one of which one end of the rotor shaft is journaled, a power output shaft journaled in the other relatively spaced bearing in said extension, a recessed gear on the power output shaft into the recess of which said extension projects and within which one of the spaced bearing is located, a gear pinion carried by the rotor shaft intermediate the relatively spaced bearings, and a gear train connecting the rotor shaft gear and power output shaft gear for unison rotation of the respective shafts.

5. In a construction of the character described, a pair of axially aligned shafts, a bearing support including a recessed hub-like extension having a lateral opening therein, a pair of relatively spaced axially aligned bearings in said hub-like extension one for each shaft, a gear upon one shaft intermediate the respective spaced bearings, a gear carried by the other shaft in surrounding overhanging relation with a portion of the hub-like extension and one of the bearings, additional bearings in axially spaced relation with said pair of bearings in which the opposite ends of the respective shafts are journaled, and a gear train connecting the respective shaft gears one with the other through the lateral opening of said hub-like extension.

6. An electric motor including a housing, a stator element within the housing, a rotor in cooperative relation with the stator, a rotor shaft, a head dividing the housing into separate compartments, an integral hollow projecting hub on said head projecting into one of the compartments and having a lateral opening therein, a pair of relatively spaced bearings in said hollow hub, additional bearings in the opposite heads of the housing in axially aligned relation with each other and with said relatively spaced bearings in the hub, the rotor shaft being journaled in one of the housing head bearings and in one of said relatively spaced hub bearings, a power output shaft in axial alignment with the rotor shaft and journaled in the other of the housing head bearings and in the other of the relatively spaced hub bearings, a gear carried by the rotor shaft within the hub and intermediate the relatively spaced hub bearings, a gear supported by the power output shaft intermediate the respective power output shaft bearings and surrounding that bearing thereof in said hub, and a gear train interconnecting said gears through the lateral opening in said head.

RICHARD A. NIEKAMP.